(12) United States Patent
Footer et al.

(10) Patent No.: US 7,793,324 B2
(45) Date of Patent: Sep. 7, 2010

(54) SYSTEM FOR OBTAINING DATA REGARDING CUSTOMER USE OF INTERACTIVE TELEVISION

(75) Inventors: Derek P. Footer, Mountain View, CA (US); Carlos Gonzalez, North Miami Beach, FL (US); Angela M. Trujillo, Weston, FL (US); Narda J. Laverde, Fort Lauderdale, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 12/072,264

(22) Filed: Feb. 25, 2008

(65) Prior Publication Data

US 2008/0155584 A1    Jun. 26, 2008

Related U.S. Application Data

(63) Continuation of application No. 09/732,498, filed on Dec. 6, 2000, now Pat. No. 7,360,231.

(60) Provisional application No. 60/201,558, filed on May 1, 2000.

(51) Int. Cl.
*H04N 7/20* (2006.01)
*H04N 7/173* (2006.01)
*H04N 7/16* (2006.01)

(52) U.S. Cl. .................... 725/64; 725/115; 725/145

(58) Field of Classification Search ............ 725/63, 725/64, 105, 115, 145
See application file for complete search history.

(56) References Cited

U.S. PATENT DOCUMENTS

| | | | |
|---|---|---|---|
| 4,581,746 A | 4/1986 | Arnold | |
| 5,163,046 A | 11/1992 | Hahne et al. | |
| 5,461,619 A | 10/1995 | Citta et al. | |
| 5,563,648 A | 10/1996 | Menand et al. | |
| 5,819,034 A | 10/1998 | Joseph et al. | |
| 5,857,190 A * | 1/1999 | Brown | 707/10 |
| 5,889,954 A | 3/1999 | Gessel et al. | |
| 5,970,071 A | 10/1999 | Le Garrec | |
| 6,052,554 A | 4/2000 | Hendricks et al. | |
| 6,067,107 A * | 5/2000 | Travaille et al. | 725/24 |
| 6,097,441 A | 8/2000 | Allport | |
| 6,097,739 A | 8/2000 | Yamashita | |
| 6,308,081 B1 | 10/2001 | Kolmonen | |

(Continued)

OTHER PUBLICATIONS

Non-final Office Action dated Oct. 15, 2008 in U.S. Appl. No. 10/731,768, filed Dec. 8, 2003 by Steven Soloff.

(Continued)

*Primary Examiner*—James Sheleheda

(57) ABSTRACT

A system and method for obtaining data regarding customer use of interactive television, where application servers residing at a broadcast center include application programs that provide customers with a graphical user interface. Customers may retrieve the application programs via a satellite through integrated receiver/decoders ("IRDs"). The IRD includes a modem, callback functionality and flash memory for storing a data log of customer transaction and navigation data. Communications servers reside at the broadcast center for receiving callbacks from the IRDs. Interactive servers also reside at the broadcast center where the interactive servers include interactive data repositories IDRs for storing data. The interactive servers may also include a parser of the data in the data log and an encapsulator of data into the appropriate protocol for database users.

8 Claims, 6 Drawing Sheets

U.S. PATENT DOCUMENTS

| | | | |
|---|---|---|---|
| 6,308,328 B1 * | 10/2001 | Bowcutt et al. | 725/111 |
| 6,466,972 B1 | 10/2002 | Paul et al. | |
| 6,782,006 B1 | 8/2004 | Tanaka et al. | |
| 6,788,710 B1 | 9/2004 | Knutson et al. | |
| 6,801,936 B1 | 10/2004 | Diwan | |
| 2001/0036198 A1 | 11/2001 | Arsenault et al. | |
| 2002/0002688 A1 * | 1/2002 | Gregg et al. | 713/202 |
| 2003/0105845 A1 | 6/2003 | Leermakers | |
| 2003/0158932 A1 | 8/2003 | Machida et al. | |
| 2003/0214982 A1 | 11/2003 | Lorek et al. | |
| 2004/0228315 A1 | 11/2004 | Malkamaki | |

OTHER PUBLICATIONS

Sun Microsystems, Inc.; "Sun Ultra 5 Service Manual"; 805-7763-13; Revision A; Feb. 2000.

Final Rejection dated Jul. 24, 2009 in U.S. Appl. No. 10/731,768, filed Dec. 8, 2003 by Steven Soloff et al.

Final Rejection dated Apr. 5, 2010 in U.S. Appl. No. 10/731,768, filed Dec. 8, 2003 by Steven Soloff.

* cited by examiner

| Field Name | Type | Length |
|---|---|---|
| Smart Card ID | String | 12 |
| Prodecer ID | String | 10 |
| Application ID | String | 12 |
| Page ID | String | 2 |
| Time Date Stamp ID | String | 8 |

SYSTEM FOR OBTAINING DATA REGARDING CUSTOMER USE OF INTERACTIVE TELEVISION

CROSS-REFERENCE TO RELATED APPLICATIONS

This application is a continuation of U.S. patent application Ser. No. 09/732,498 filed Dec. 6, 2000 now U.S. Pat. No. 7,360,231, entitled SYSTEM FOR OBTAINING DATA REGARDING CUSTOMER USE OF INTERACTIVE TELEVISION, by Derek P. Footer, Carlos Gonzalez, Angela M. Trujillo and Narda J. Layerde, which claims the priority benefit under 37 U.S.C. §119(e) of U.S. provisional application Ser. No. 60/201,558 filed May 1, 2000, entitled INTERACTIVE DATA REPOSITORY FOR INTERACTIVE TELEVISION, by Derek P. Footer, Carlos Gonzalez, Angela M. Trujillo and Narda J. Layerde, all of which applications are hereby incorporated by reference herein.

BACKGROUND OF THE INVENTION

1. Field of the Invention

The invention generally relates to methods and systems for collecting and recording data and communication functionality in databases and more particularly to methods and systems for collecting and recording navigation and transaction data regarding customer use of interactive television.

2. Description of the Prior Art

Satellites have had a significant impact on the television industry. With an orbital location so far from earth, satellites transmit a usable signal over a broad footprint. The large geographical coverage of satellite makes it possible to serve thousands, if not millions, with a single satellite. People use individual satellite dishes for direct to viewer ("DTV") television systems. Recently, interactive television has become available. With interactive television, a viewer can make transactions or navigate information systems through applications made available through the DTV system.

The basic components of a satellite system are one or more transmitting earth stations, the uplink, the satellite, the downlink, and one or more receiving earth stations. The communications satellite is a radio relay operating in space for ten or more years without the need for on-site servicing or adjustment. Satellites contain transceivers that receive and transmit signals, including video programming, telephone calls and data. They operate in a vacuum at a location exposed to extreme temperature changes.

Presently, there is no system or method for obtaining navigation and transaction data regarding customer interactive television actions in an Information Data Repository ("IDR"). Only providers of content, such as banks providing transactions, can obtain such data, while the data is generally unavailable to the information broadcaster and others. Present smart card systems can only log and transmit very limited viewer preference information due to the limited available memory and an inability to access the user input data. The use of flash memory allows for the download of data logs through callbacks from the integrated receiver/decoders ("IRDs") used in satellite television systems. Furthermore, a system for extraction of this data would be preferably scalable to accommodate future growth. Such a system and method would enable convenient transactions and precise recording of user patterns. There is also a need for a system and method for the collection, administration and management of the information that is provided and processed by the various interactive television applications to and from geographically dispersed operating companies.

It is, therefore, to the effective resolution of the aforementioned problems and shortcomings of the prior art that the present invention is directed.

SUMMARY OF THE INVENTION

The present invention provides a system and a method for storing interactive television data in an interactive data repository ("IDR") for access by the information broadcaster and others. Each interactive television application contains programs and/or libraries. The programs and libraries collect specific data pertaining to individual business needs. The data is stored in a memory such as flash memory in the customer's IRD. Depending upon the application, the data is communicated to a communication server at an operating company through a modem at real time or at scheduled intervals. The data is then communicated to an interactive server and then stored in an IDR.

The present invention overcomes the disadvantages of the prior art by allowing customer use of interactive television data to be collected in an interactive data repository ("IDR"). The data may be downloaded from the IRDs of the customer without requiring the customer to do anything other than normal transactions and navigation within interactive television applications. The IDR may be correlated with an interactive business system ("IBS") database, which contains information about the downloading IRD, such as the identity of the customer and other information about the customer.

In accordance with the purpose of the invention, as embodied and broadly described herein, the invention is a system and method for obtaining data regarding customer use of interactive television, comprising one or more application servers including one or more application programs for the input of information by a customer; a broadcast center for communicating one or more application programs with a communications satellite; one or more individual satellite dishes for receiving one or more application programs from the communications satellite in electronic communication with one or more integrated receiver/decoders ("IRDs"); a Graphical User Interface ("GUI") for a customer to input information into the application program and in electrical communication with one or more modems, wherein the IRDs comprise callback functionality and flash memory for storing a data log of customer transaction and navigation information, wherein said one or more modems are in electronic communication with one or more communications servers for receiving callbacks from the IRDs; one or more communications servers for receiving the callback; and one or more interactive servers in electronic communication with one or more interactive data repositories ("IDRs") for storing data.

In further accordance with the purpose of the invention, as embodied and broadly described herein, the interactive server of the invention comprises a parser of the data in the data log and an encapsulator of the information into appropriate protocol for database users, said interactive server being in electronic communication with one or more IDRs, wherein the IDR is in communication with an interactive business system ("IBS") wherein data in the IDR is correlated with data in the IBS.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

In accordance with these and other objects which will become apparent hereinafter, the instant invention will now be described with particular reference to the accompanying drawings.

DESCRIPTION OF THE PREFERRED EMBODIMENTS

Figure 1:
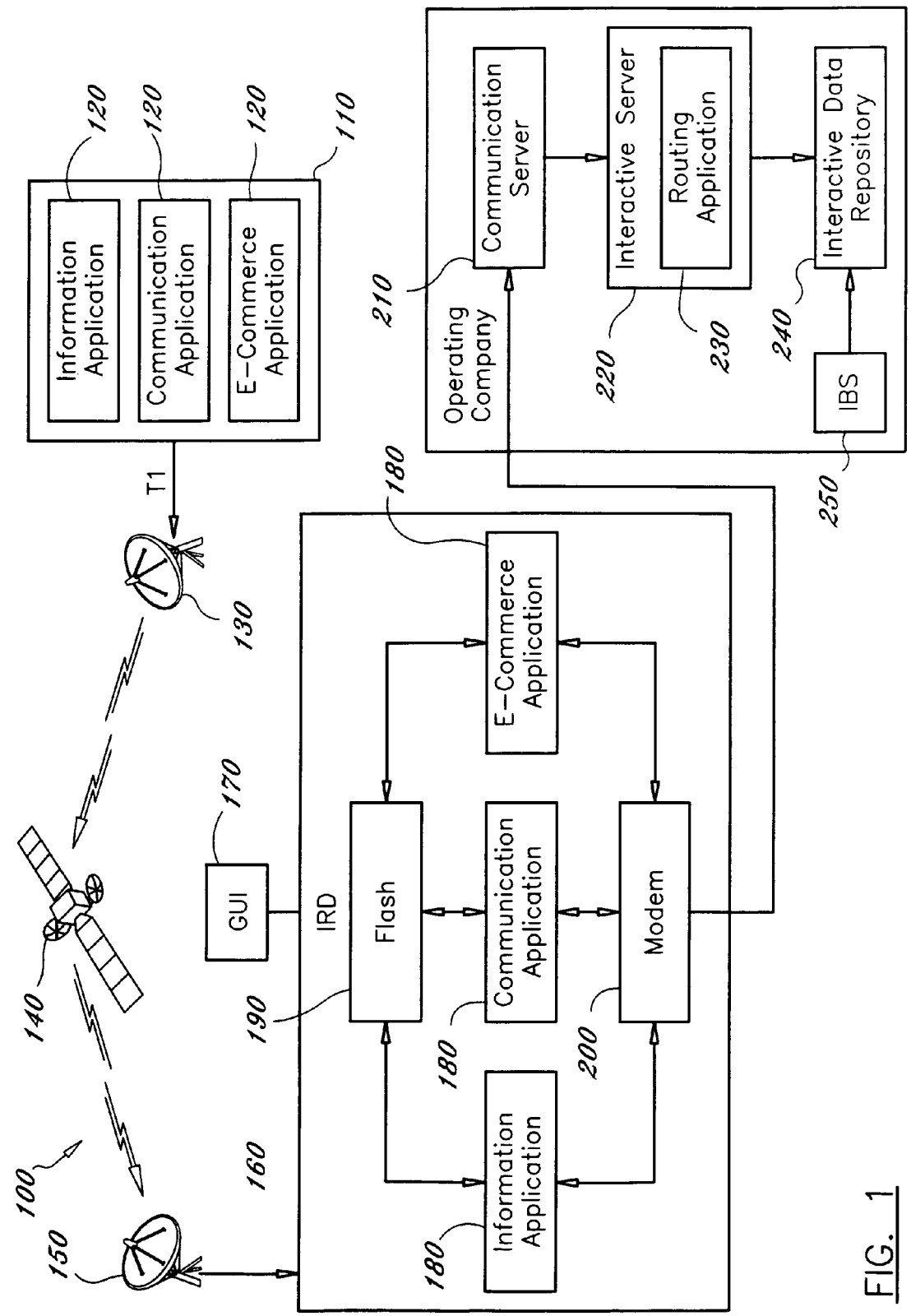
FIG. 1 illustrates the architecture of the hardware components of the present invention.

Referring to FIG. 1, the system architecture of the present invention 100, a system for obtaining data regarding a customer's interactive television use, is shown.

One or more application servers 110 carries one or more application programs 120. The application program 120 may provide information to the customer, communications functionality such as communication with a bank, or electronic commerce functionality, or any combination of these services. The preferred application server 110 is a Sun Ultra 5 server, although an NT server or equivalent server may be used. The application program 120 may be one written in OpenTV or an equivalent language. The application program 120 allows the input of information by a customer. The application program 120 is transmitted to a broadcast center 130.

Transmission to the broadcast center 130 may be via a terrestrial T1 link or its equivalent. The application program 120 is then uplinked to a communications satellite 140, preferably a G8i satellite or equivalent. One or more customers, at a location within the satellite's footprint, in South America for example, receives the application program 120 via his or her individual satellite dish ("ISD") 150, and then into one or more integrated receiver/decoders ("IRDs") 160.

The IRD 160 is connected to the customer's graphical user interface ("GUI") 170. The GUI 170 is preferably the customer's television connected to a standard remote or keyboard as is known in the art, whereby the customer makes transactions or navigates through an interactive television interface portion of the application program. As the customer navigates and performs actions in the interactive television interface, the customer inputs transaction and navigation information into the application program 120 via the interactive television interface. The information is stored in the IRD 160 as a data log 180 of navigation data and transaction data input by the user into the one or more application programs 120 via the GUI 170. For example, the user may impart information regarding games played, weather requests, advertising viewed, navigation within the interactive television environment and lead generation. In addition, transaction data such as for banking transactions may be input via the GUI 170. Preferably, the data log 180 also includes a time and date stamp for each action by the customer.

Figures 2, 3A:
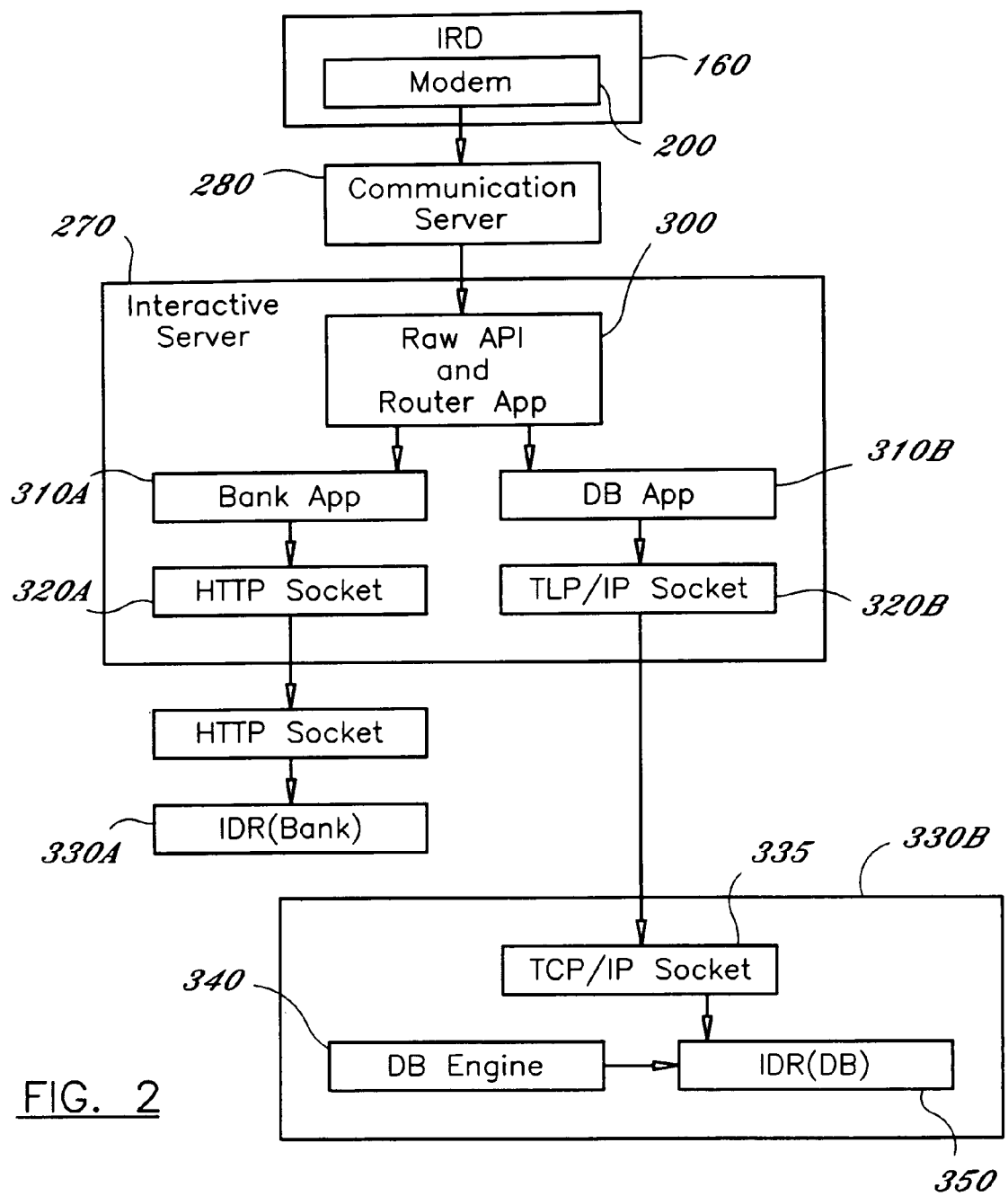
FIG. 2 is a block diagram illustrating the data flow from the customer's IRD to the IDR.
FIG. 3A is an illustration of the form of the data for each customer action being stored in the IDR.
Figure 3B:
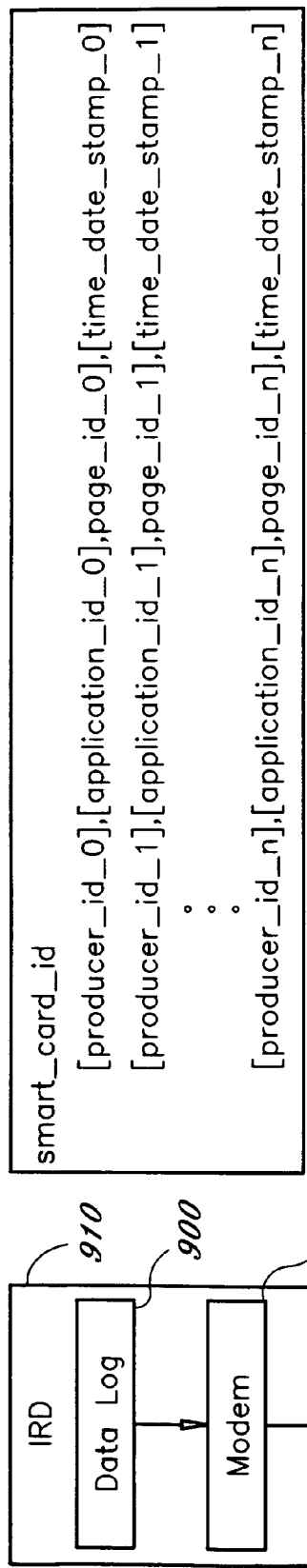
FIG. 3B is an illustration of the form of the customer action data log being stored in and downloaded from the IDR.

The data log 180 is then stored within flash memory 190 within the IRD 160. Preferably, the flash memory 190 is stored in a communication card with an identification number located within the IRD 160. However, the data log 180 may also be stored in random access memory stored within the IRD 160. The preferred format of the data log is illustrated in FIGS. 3A and 3B, described in greater detail below. Thus, in the preferred embodiment, every time a customer accesses an interactive television application 120 and performs an action within it, the type of action and the time and date of the action within the interactive application 120 are stored in the data log in flash memory 190.

Through a callback procedure, the data log 180 is transmitted from the IRD 160 through a modem 200. The data log 180 is encapsulated in a data transfer protocol. Any appropriate protocol for data transmission may be used, such as TCP/IP or HTTP. In the preferred embodiment, the protocol is one that is proprietary to Telefonico Investigacion y Desarrollo, S.A.

In the callback procedure, the IRD 160 transmits the data log 180. The callback may be made at certain time intervals or after a fixed number of transactions, or upon some other standard. The data log 180 is then communicated to a communications server 210.

The callback originates as a program within the IRD 160. The callback sends the data log 180 from the IRD 160 through the communications server 210 through the interactive server 220 and the routing application 230 within the interactive server 220 to the interactive data repository ("IDR") 240. In performing the callback, the IRD 160 is preferably programmed to make several attempts to transmit the data log 180 if it fails initially to make the necessary connection.

The communications server 210 may be a server such as an Ascend Max 4004. However, the communications server 210 may also be a bank of modems for accepting callbacks from the IRD 160. The modems may be integral with each other or, in the preferred method, they may be leased from outside sources for scalability.

After the data log 180 is transferred from the IRD 160 through the communications server 210, to the interactive server 220. The interactive server 220 strips the transfer protocol from the data log 180, parses each discrete customer action within the data log 180, encapsulates each action into data with an appropriate protocol, and multiplexes the newly encapsulated data. In the preferred embodiment, the interactive server 220 identifies a particular interactive television action by a code and routes it to an appropriate IDR 240. The interactive server 220 encapsulates the data into TCP/IP form for transmittal. However, other protocols are known in the art and may be used. The interactive server 220 is preferably a Sun Ultra 5 with a 333 MHz CPU and 256 MB of RAM or its equivalent. As shown in FIG. 1, the interactive server 220 includes a routing application 230 for routing the newly encapsulated particular action data taken from the data log 180 transferred via the callback. The routing application 230 is preferably written in Unix C, however it may also be written in OpenTV or an equivalent programming language. From the routing application 230, the information regarding the particular action is communicated to one or more interactive data repositories ("IDR") 240. The IDR 240 is preferably a memory storage and manipulation device, such as a computer database.

In the preferred embodiment, the particular action data within the IDR 240 is then correlated with an integrated business system ("IBS") 250. The IBS 250 in the preferred embodiment contains information that can be correlated with the information sent to the IDR 240. For example, in the preferred embodiment, the IDR 240 contains an identification number for the communications card containing the flash memory 190 in the IRD 160 that initiated the callback. This identification number is made part of the log transmitted in the callback. The IBS 250 may include the name, biographical information and other information regarding the interactive television customer that uses the IDR 240. Thus, information about a customer's interactive television navigation and transaction habits may be derived. Clearly, this system 100 is intended to be used for a multiple of customers and a corresponding multiple of IRDs 160. In the preferred embodiment, the IBS 250 is a program written in Magic and SQL on a HP9000 server or IBM RS 6000/H70 server. However, equivalent programming languages and servers are also contemplated.

As shown in FIG. 1, the communications server 210, interactive server 220, IDR 240 and IBS 250 are all in the location of the operating company 260. In Latin America, an operating company 260 is often a government monopoly, so the operating company is in fact also an operating country. However, an individual company that is not part of a government monopoly may also use this system 100. The IDR 240 and the IBS 250 may alternatively be in separate operating companies. In addition, in the preferred embodiment, the IDR 240 includes the ability to generate reports using the individual action data taken from the interactive server 220 from one or more IDR 240 downloads. Furthermore, the data in the IDR 240 may be communicated to another central IDR. The communication may be performed by satellite.

FIG. 2 illustrates an embodiment of the invention where individual action data including customer navigation data and transaction data is distributed to two different interactive content providers 330A,330B under two different protocols. As shown in FIG. 1, the data log 180 is downloaded from the IRD 160 in a callback via a modem 200 to the communications server 280. The data log 180 then flows from the communications server 280 to the interactive server 270. In the preferred embodiment, as described above, the data log 180 from the callback flows in encapsulated form. Within the interactive server 270, the data log 180 is then communicated to an Application Program Interface ("API") 300. The API 300 strips the encapsulating protocol from the data log 180 and parses the individual transaction data from the data log 180. Each particular action performed by the customer preferably has its own identification number. The API 300 examines the particular action and looks for the identification code associated with a particular database user or interactive television content server 330A,330B. The data associated with each particular action is then communicated via the router application 300. The router application 300 puts the individual transaction data into pre-selected protocol and distributes the data to the different content servers 330A,330B. Preferably, the router application is written in OpenTV.

As shown in FIG. 2, the API 300 converts the individual action data to different protocol forms. The interactive television action for each content provider 310A,310B is then communicated from the interactive server 270. For example, a bank content provider 330A may require its information 310A to be in a protocol such as HTTP. Alternatively, the bank may request information to be sent to it in its own proprietary protocol. The bank 330A thereby allows interactive television customers to make secure banking transactions while the interactive television content provider tracks the time, date and number of transactions.

In the preferred embodiment, the data for the bank 330A is communicated through the interactive server 270 through a HTTP socket 320A in the interactive server 270. In addition, data for a different content provider 330B may be communicated through the interactive server 270 via a different protocol, such as through a TCP/IP socket 320B. The different content provider 330B could obtain navigation data or customer action data. Thus, secure communication may be made, with only a record of the customer's action being made for the database user or interactive television content provider. Other protocols are also contemplated.

For example, a deposit could be made in a bank account via an interactive television application, and a record that a deposit was made may be recorded, while the amount of the deposit and the account number of the deposit may remain secure with regard to the interactive television application provider. The interactive server 270 may also use other protocol sockets, such as those for IMAP and bank proprietary protocols. Several database users or content providers may be included in the system. Each content provider 330A,330B may have a different protocol for distribution of the information regarding an action associated with it. However, more data may be transferred if the protocol is one that is not CPU intensive, such as TCP/IP.

In one embodiment of the invention shown in FIG. 2, the database user 330B receives the interactive television action information through its own TCP/IP socket 335, and stores the information in its IDR 350. The database user 330B would then be able to extract a report of the relevant portions of the information 180 in the IDR 350, such as the number of actions, or the date, time and frequency of particular actions. In addition, a database engine 340 as is known in the art may be used to extract information from the database user's database 350.

FIG. 3A illustrates the preferred form that the information 180 is to take. Fields may include Smart Card ID, Producer ID, Application ID, Page ID and a Time/Date/Stamp ID. For example, Smart Card ID can be used to identify the communications card and thus, the IRD 160, from which the data log 180 is coming. Producer ID can identify the producer of the services offered and accepted, Application ID can identify which application from a particular producer has been accessed, Page ID may describe which page of several was accessed within a particular application, and a Time/Date/Stamp ID would identify when the individual action occurred. However, other data names and data retrieved are also contemplated. The data as shown are string variables. However, it may also be appropriate that they be numerical. Finally, it is important that the data fields be of appropriate length. The lengths of the variables in FIG. 3A are merely illustrative. FIG. 3B illustrates how the data log 180 comprises a number of single actions.

Figure 4:
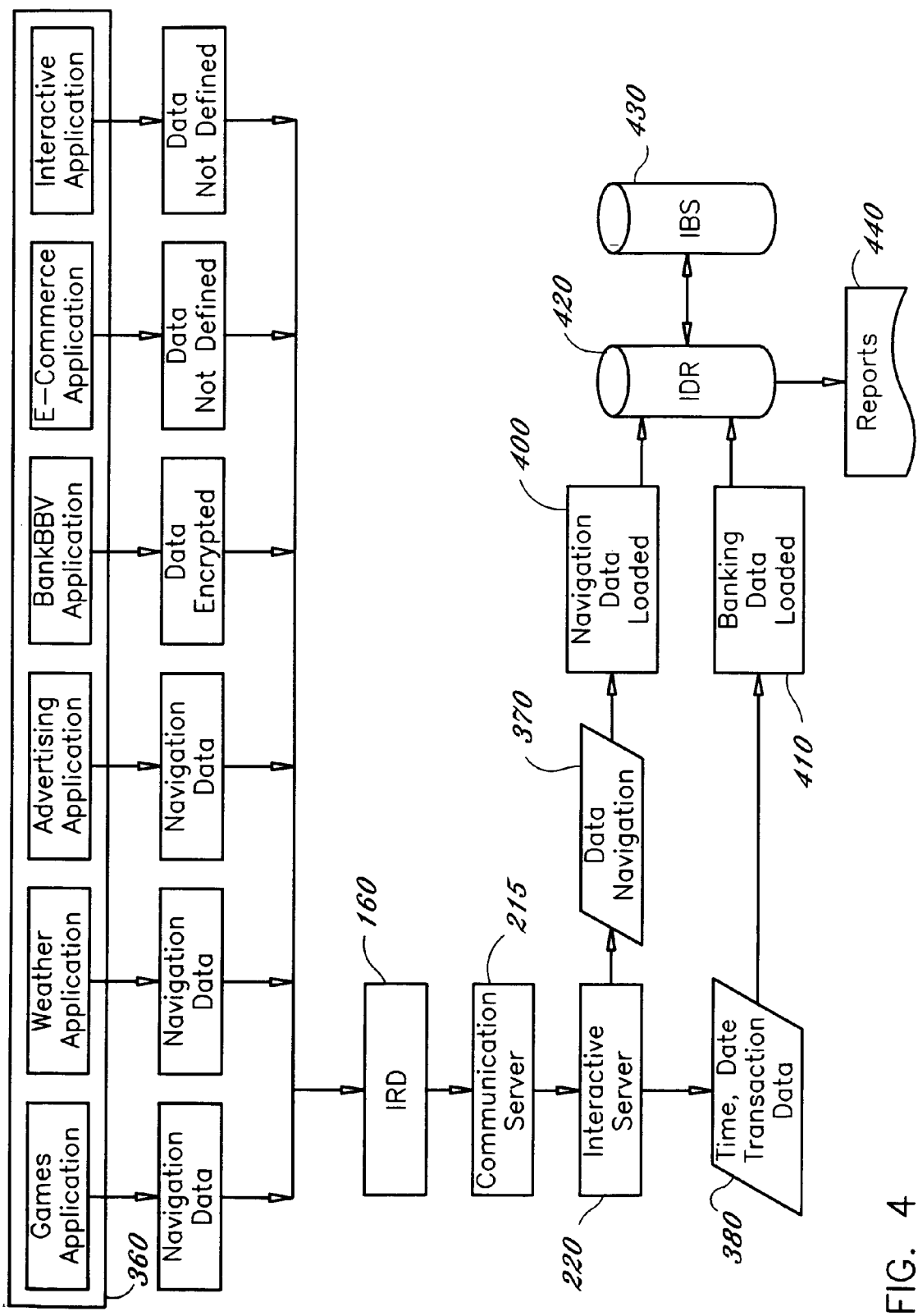
FIG. 4 is a block diagram illustrating data flow from the IRD to the user's top level application in the preferred embodiment.

FIG. 4 illustrates data flow during the preferred use of the system 100 in obtaining two types of particular action data—navigation data 370 and transaction data 380. As shown, data from various interactive television applications 360 may be obtained in the IRD 160 and saved as a data log as described above. In the preferred embodiment, the data can include navigation data 370 from within applications such as a gaming application, weather application, or advertising application. Also, transaction data 380 may be obtained from a banking application, e-commerce application or other interactive application. In a banking application, the particular action data is preferably encrypted. Since the nature of the particular action data in this example is a transaction, navigation data within the banking application is not obtained. Similarly, as shown at 360 in FIG. 4, e-commerce applications or other interactive television applications may have their data encrypted or their data may not be defined pursuant to the parameters defined in the IRD 160. In that case, the IRD 160 may still obtain transaction data 380.

All of the customer actions 360 are then obtained and stored in the IRD 160 as a database of customer actions until a callback is initiated. Upon callback, the IRD 160 transmits the actions 360 to a communication server 215. In the preferred embodiment, the information 360 is transmitted in a proprietary interactive server protocol. The communication server 215 receives the callbacks in the preferred embodiment. The interactive server 220 encapsulates the individual action data taken from the data log 180 into TCP/IP protocol and multiplexes the data for efficient distribution. However, where an application is a banking application to be encapsulated in a protocol proprietary to a bank, encapsulation to a protocol before encapsulation into the banking protocol is unnecessary.

After the interactive server 220 parses the information 360 into data regarding particular interactive television actions, the interactive server 220 determines the proper protocol for the transfer of the information and converts that information into that protocol. In the preferred embodiment, each transaction is identified by a code when it is input into the flash memory. When the transaction is parsed, the interactive server 220 reads the code and puts the appropriate particular action in the appropriate protocol associated with the code. That information, properly converted, is routed to the appropriate database user. In the example illustrated in FIG. 4, the navigation data 370 and the transaction data 380 are routed separately. The navigation data 370 and the transaction data 380 are then preferably loaded 400,410 into the IDR 420. The IDR 420 would interact with an IBS 430, so the data in the IDR 420 would be correlated with the data in the IBS 430. Reports 440 may be generated from the IDR 420 alone, or after correlation with the IBS 430.

Figure 5:
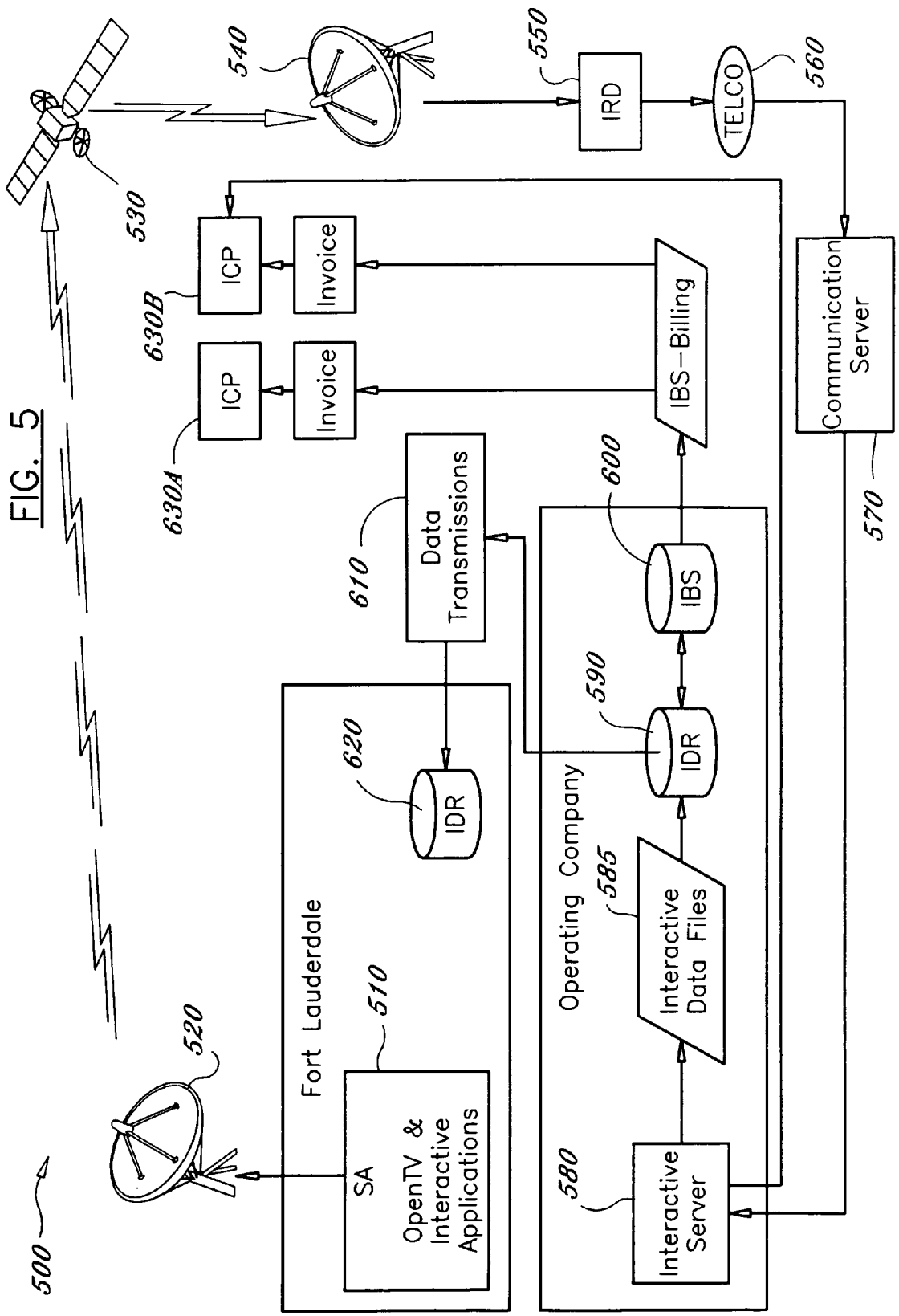
FIG. 5 is a block diagram illustrating data flow in an alternative embodiment of the invention.

FIG. 5 shows an alternate embodiment of a system 500 for the obtainment of data from interactive television, wherein an IDR 620 is kept at a central location as well as at one or more operating companies 590. In FIG. 5, the application server 510 is in a central location, such as Fort Lauderdale, Fla., and is transmitted to a broadcast center 520. One or more application programs 510 are transmitted to the satellite 530 and down to an ISD 540 into an IRD 550. The IRD 550 transmits a data log of navigation and transaction information via callback through a telephone line 560 within a country's telephone system. The data log is sent through a communication server 570 and interactive server 580 as discussed above. The communications server 570 and the interactive server 580 may alternatively be located at the same operating company. Interactive television actions 585 are then communicated to an IDR 590, such as an IDR 590 for a particular Interactive Content Provider ("ICP") 630.

As described above, the operating company IDR 590 is in communication with an operating company IBS 600. The operating company IBS 600 preferably includes data such as the identification of the customer associated with the IRD 550 used for a particular interactive television action 585. Thus, a customer may be accurately identified with an action and may be properly billed for the action. Also, other uses for the data may be made. The data for the particular action 585 is transmitted to the operating country IDR 590, and then may be transmitted 610 to a central IDR 620, shown in FIG. 5 to be in Fort Lauderdale. The file of particular actions 585 is then communicated to one or more database users, or interactive content providers ("ICPs") 630A,630B. The ICPs 630A, 630B may or may not be at the location of the operating country. Data transmission between the operating company IDR 590 and the central IDR 620 in the preferred embodiment is via two-way satellite, such as the 8 gi satellite used by Galaxy Latin America. However, other data transmission methods known in the art may also be used. The data from more than one operating company IDR 590 may thus be transmitted and held in the central IDR 620. In another embodiment, a central IBS is correlated with the central IDR 620.

Figure 6:
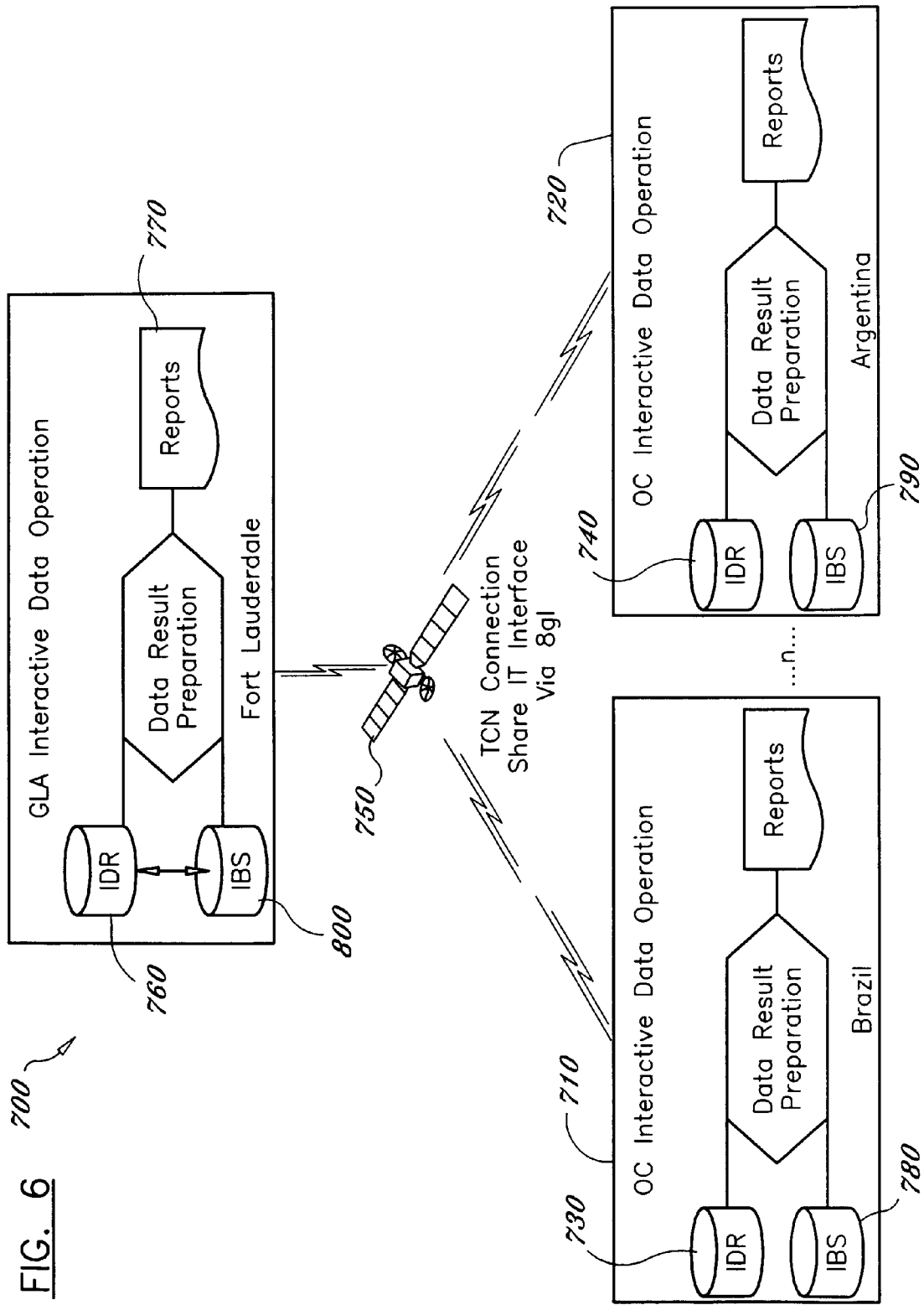
FIG. 6 is a block diagram illustrating data transmission in an alternative embodiment of the invention.

A system for the two-way distribution of information of an operating companies IDR is further illustrated in FIG. 6 at 700. From each operating company 710,720, data is extracted from the IDR 730,740 and transmitted via satellite 750 to a central IDR 760 that will be able to produce consolidated reports 770. Data in the operating company IDRs 730,740 may still be correlated with one or more IBSs 780,790 within each operating company 710,720. Preferably, the protocol for the satellite interface would be consistent for all broadcast centers for each operating country. The data sent to the central IDR 760 may be data from the operating company IDR 730, 740. The data may then be correlated with a central IBS 800. Alternatively, the data sent may be data from the operating company IDR 730,740 after it has been correlated with the operating company IBS 780,790.

Figure 7:
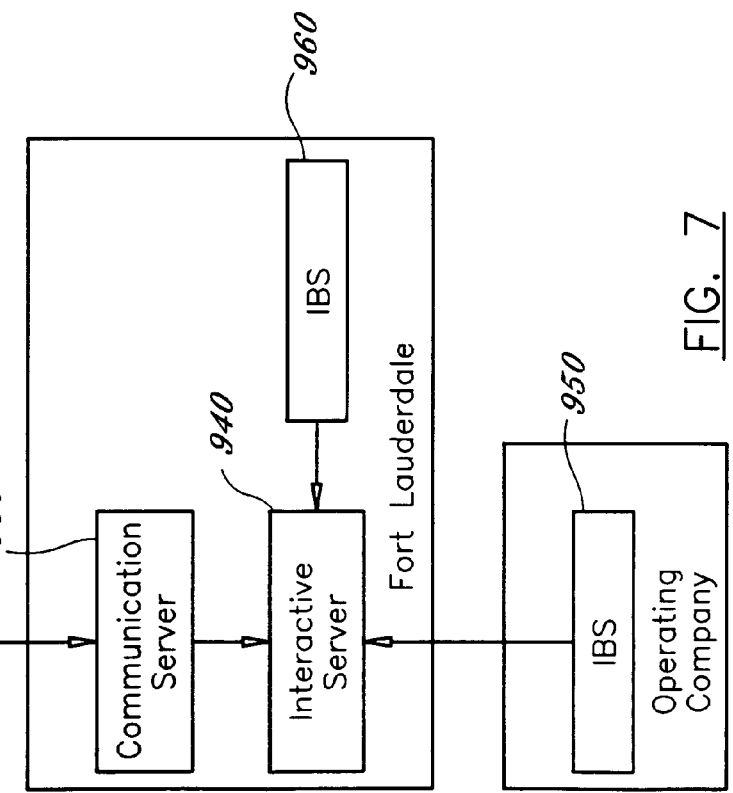
FIG. 7 is an alternative embodiment of the invention.

In an alternative embodiment, illustrated in FIG. 7, a data log 900 is downloaded from the IRD 910 through a modem 920 via a callback. The communication server 930, a bank of telephone modems in this embodiment, receives the callbacks and transmits the data log 900 to an interactive server 940. The data log 900 is encapsulated in a data transmission protocol, such as TCP/IP. The interactive server 940 strips the protocol from the data log 900, and saves the data on the interactive server. Preferably, the data is saved as a data table. Preferably, the data table is a flat table of ASCII text. However, for other applications, the data may be saved in other forms, such as a relational database. Database users, such as the operating companies, would be able to access the data stored in the interactive server 940 by download from a file server, the internet or other means known in the art. An IBS used to identify a customer or provide supplemental information to that in the saved data could reside in the operating company 950, at the facility of the interactive server 960, or both.

What is claimed is:

1. A system for obtaining data regarding customer use of interactive television, comprising:

a plurality of application servers including a like plurality of different application programs transmitted to users via at least one broadcast center;

at least one integrated receiver/decoder (IRD) that receives the at least one application program from the at least one broadcast center, where the IRD may transmit signals via a modem;

at least one graphic user interface (GUI) provided for each IRD, where the at least one GUI enables users to interact with and input data to the least one application program, where the IRD includes callback functionality and memory;

a data log of user actions including user transactions and navigation activity, each user action identified by a code, each said code assigned to each said user transaction and navigation activity associated with the particular application program and an encapsulation protocol where at least two said codes specify different encapsulation protocols, said data residing in the memory;

at least one communications server for receiving any callback functionality including the data log;

at least one interactive data repository (IDR) for storing data; and at least one interactive server where the at least one interactive server receives signals including the data log from the least one communication server, parses the data log into user actions, reads the code associated with each user action, determines the encapsulation protocol associated with the code and encapsulates the data for each user action in the encapsulation protocol for IDR users and routes the encapsulated data to the at least one IDR, wherein said at least one interactive server encapsulates data in said two different encapsulation protocols and routes the encapsulated data to respective local IDRs.

2. The system of claim 1, wherein each IRD encapsulates the data log in a data transfer protocol for transmission to the communications server, said at least one interactive server strips the data transfer protocol from the data log and then parses the data log into user actions.

3. The system of claim 1, wherein said at least one IDR is in communication with at least one interactive business system ("IBS") wherein data in each IDR is correlated with data in the IBS.

4. The system of claim 1, further comprising:

a communications satellite, where the communications satellite receives transmissions from the at least one broadcast center; and a plurality of satellite dishes that receive the at least one application program via the communications satellite, where each satellite dish transmits signals to an IRD.

5. The system of claim 1, for obtaining data regarding customer use of interactive television, comprising:

at least one application server including at least one application program where the at least one application program is transmitted to users via at least one broadcast center;

at least one integrated receiver/decoder (IRD) that receives the at least one application program from the at least one broadcast center, where the IRD may transmit signals via a modem;

at least one graphic user interface (GUI) provided for each IRD, where the at least one GUI enables users to interact with and input data to the at least one application program, where the IRD includes callback functionality and memory;

a data log of user actions including user transactions and navigation activity, each user action identified by a code, said data residing in the memory;

at least one communications server for receiving any callback functionality including the data log;

at least one interactive data repository (IDR) for storing data; and at least one interactive server where the at least one interactive server receives signals including the data log from the at least one communication server, parses the data log into user actions, reads the code associated with each user action, determines the protocol associated with the code and encapsulates the data for each user action in the protocol for IDR users and routes the encapsulated data to the at least one IDR, wherein the interactive server encapsulates user action data having different codes in different protocols and routes the encapsulated data to the same IDR.

6. The system of claim 5, further comprising:

a communications satellite, where the communications satellite receives transmissions from the at least one broadcast center; and a plurality of satellite dishes that receive the at least one application program via the communications satellite, where each satellite dish transmits signals to an IRD.

7. A system for obtaining data regarding customer use of interactive television, comprising:

at least one application server including at least one application program where the at least one application program is transmitted to users via at least one broadcast center;

at least one integrated receiver/decoder (IRD) that receives the at least one application program from the at least one broadcast center, where the IRD may transmit signals via a modem;

at least one graphic user interface (GUI) provided for each IRD, where the at least one GUI enables users to interact with and input data to the at least one application program, where the IRD includes callback functionality and memory;

a data log of user actions including user transactions and navigation activity, each user action identified by a code, wherein for at least one application program the said transaction and navigation activity have different codes associated with different protocols, said data residing in the memory;

at least one communications server for receiving any callback functionality including the data log;

at least one interactive data repository (IDR) for storing data; and at least one interactive server where the at least one interactive server receives signals including the data log from the at least one communication server, parses the data log into user actions, reads the code associated with each user action, determines the protocol associated with the code and encapsulates the data for each user action in the protocol for IDR users and routes the encapsulated data to the at least one IDR, said at least one interactive server encapsulating transaction and navigation activity data for the same application program in different protocols and routing the encapsulated data to the same IDR.

8. The system of claim 7, further comprising:

a communications satellite, where the communications satellite receives transmissions from the at least one broadcast center; and a plurality of satellite dishes that receive the at least one application program via the communications satellite, where each satellite dish transmits signals to an IRD.

* * * * *